(12) United States Patent
Albert et al.

(10) Patent No.: US 10,548,306 B2
(45) Date of Patent: Feb. 4, 2020

(54) WEED CONTROL DEVICE

(71) Applicant: Robert Bosch GmbH, Stuttgart (DE)

(72) Inventors: Amos Albert, Leonberg (DE); Andreas Michaels, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 15/576,914

(22) PCT Filed: May 19, 2016

(86) PCT No.: PCT/EP2016/061195
§ 371 (c)(1),
(2) Date: Nov. 27, 2017

(87) PCT Pub. No.: WO2016/193003
PCT Pub. Date: Dec. 8, 2016

(65) Prior Publication Data
US 2018/0139947 A1    May 24, 2018

(30) Foreign Application Priority Data
May 29, 2015   (DE) ........................ 10 2015 209 879

(51) Int. Cl.
*A01M 21/02* (2006.01)
*A01B 39/18* (2006.01)
*A01M 21/04* (2006.01)

(52) U.S. Cl.
CPC ............. *A01M 21/02* (2013.01); *A01B 39/18* (2013.01); *A01M 21/046* (2013.01)

(58) Field of Classification Search
CPC .... A01M 21/00; A01M 21/04; A01M 21/046; A01B 39/18; A01D 41/06

USPC .................................................... 47/1.43, 1.5
See application file for complete search history.

(56) References Cited

U.S. PATENT DOCUMENTS

| 5,329,727 A * | 7/1994 | Dixon | A01M 21/043 15/210.1 |
| 5,430,970 A * | 7/1995 | Thompson | A01M 7/006 43/138 |
| 6,443,365 B1 * | 9/2002 | Tucker | A01M 7/0089 239/155 |

(Continued)

FOREIGN PATENT DOCUMENTS

| DE | 4039797 A1 | 9/1991 |
| DE | 19530356 A1 | 4/1997 |

(Continued)

OTHER PUBLICATIONS

International Search Report dated Aug. 1, 2016, of the corresponding International Application PCT/EP2016/061195 filed May 19, 2016.

*Primary Examiner* — David J Parsley
*Assistant Examiner* — Danielle A Clerkley
(74) *Attorney, Agent, or Firm* — Norton Rose Fulbright US LLP; Gerard Messina

(57) ABSTRACT

A device for damaging weed is provided, the device having a working tool, which is designed to damage the weed; a classification unit, which has positional data of the weed and/or which is designed to detect weeds; a localization unit, which is designed to ascertain a relative position between the working tool and the weed; and a manipulator unit, which is designed to correspondingly position the working tool as a function of the ascertained relative position.

12 Claims, 3 Drawing Sheets

(56) References Cited

U.S. PATENT DOCUMENTS

| | | | |
|---|---|---|---|
| 9,609,858 B2 * | 4/2017 | Stowe | A01D 34/015 |
| 9,609,859 B2 * | 4/2017 | Stowe | A01D 34/015 |
| 2003/0136048 A1 * | 7/2003 | Newson | A01G 11/00 47/1.3 |

FOREIGN PATENT DOCUMENTS

| | | | | |
|---|---|---|---|---|
| DE | 102013222776 A1 * | 5/2015 | | A01M 21/02 |
| FR | 2860124 A1 | 4/2005 | | |

* cited by examiner

WEED CONTROL DEVICE

BACKGROUND INFORMATION

Weed control is a very labor-intensive task in the agricultural sector, especially in the cultivation of organic crops where the use of chemicals is prohibited or restricted. Depending on the planted crop, a weed control in the immediate vicinity of the crop is required. This control generally takes place at an early growth state. At this point, crop plants as well as weeds are still very small and in close proximity to one another. In order to avoid damage to the crop plant, it is useful to employ selective methods. In organic farming (e.g., for carrots), this is done by labor-intensive, physically harmful manual work (employing what is known as "weeding floaters": seasonal workers lying on their bellies on a platform and pulling weeds).

The present invention performs this work autonomously and also takes economical demands into account (rapid and precise work).

For special crops that have greater planting clearances (e.g., sugar beet, salad), conventional tractor attachment devices are able to identify individual crop plants and actuate corresponding tools in such a way that the area of the crop plant remains untouched. No selectivity is necessary for such a task. In other words, these systems do not examine the area to be worked; instead, the tool is steered "in blind mode" based on the known position of the crop plant. As a rule, the distance from the crop plant defines the precision demands.

However, none of the conventional devices is accurate enough to perform a weed control in the case of crops that feature small planting clearances (such as carrots). Here, a weed control in the immediate vicinity of the crop plant is necessary at an early stage and currently demands manual work.

German Patent No. DE 40 39 797 A1 describes a device for weed control in which an actuator for destroying the weeds is in permanent operation and is briefly interrupted only when a sensor detects a crop plant.

SUMMARY

In accordance with the present invention, a device for damaging weed as well as a method for damaging weed are provided. Because of the device according to the present invention and the method according to the present invention, it is now possible to carry out a weed control very rapidly and precisely. Especially when crops are involved that have small planting clearances (such as carrots), the present invention makes it possible to damage or kill the undesired weed in the immediate vicinity of the crop plant at a very early stage.

The manipulator unit is a unit that is separate from the device. In particular, the manipulator unit is designed to position the working tool independently of the movement of the device as a whole. In addition, the manipulator device is developed to position the working tool relative to and independently of the device. Moreover, the manipulator unit is developed to move or position the working tool parallel to the ground, especially in all three dimensions.

It is advantageous if the working tool is designed to exert a pressure in the form of a pulse in order to damage the weed, the working tool in particular being developed as a stamp. Within the scope of the present invention, the term 'stamp' describes a device that is designed to mechanically press plants or weeds into the ground, thereby giving the crop plant a growth advantage. In this case, the selective and pulse-type triggering of the mechanical stamp may be possible with the aid of a rotating flywheel mass, for example, by which the required energy is able to be built up and stored (principle of a battery-driven nail gun). The selective and pulse-type triggering of the mechanical stamp may also be achieved through selective charge-exchange processes (principle of the shock-wave injector, eddy-current actuator), the buildup and the storage of the electrical energy possibly taking place with the aid of capacitors or coils, for example. Furthermore, the pulse-type triggering of the mechanical stamp may also be realized through an ignition of a gas charge. Another alternative consists of storing the energy using pneumatic or hydraulic modules with a pulse-type triggering of the mechanical stamp by opening a valve (principle of a compressed-air nail gun).

In accordance with the present invention, it is possible to provide the following measures for damaging the weeds: a laser for the selective introduction of energy to the weeds (destruction of the cell structure, growth inhibition); a bundled water jet having a corresponding mechanical destructive effect; selective spraying or irradiation using chemical means (micro-dot) instead of a surface application; selective influencing of the weeds by injection using corresponding means for growth inhibition or destruction. For one, the pulse-type rapid triggering of the working tool makes it is possible to largely dispense with the compensation of the ego-movement of the device according to the present invention in the driving direction. For another, there is hardly any earth movement during the stamping process, so that the likelihood that additional weeds will sprout is reduced or ruled out.

It is furthermore advantageous if the classification unit has the positional data of the weed available, especially in the form of a map, and/or if it detects the weed with the aid of a camera unit and/or a laser unit. The map may include registered images of registered plants. In addition, the map may be stored in a memory unit of a control unit of the device, for instance. However, it is also possible that the positional data of the weed is received by a receive unit of the control unit of the device.

Alternatively and/or cumulatively, the classification unit may also be designed to detect the weed with the aid of imaging methods and through an object classification. In this context, the classification may be implemented on the basis of the plant morphology with the aid of a conventional camera, a 3D-camera and/or a laser, for example. In addition, the classification may also be carried out by evaluating the data from multi- and/or hyper-spectral cameras, in which case the reflectivity at different wavelengths is evaluated and the classification is thereby made possible on the basis of certain plant characteristics.

Because of this measure, the area around the crop plant is not simply worked "blindly"; instead, the weed to be controlled is directly detected and registered, so that an efficient weed control is able to take place even at a very short distance from the crop plant.

In addition, it is advantageous if the localization unit ascertains the relative position between the working tool and the weed with the aid of a camera unit and/or a laser unit. This measure makes it possible to further increase the precision of the weed-control process. Since generally greater uncertainties such as how well for example the sensor meets its target, the movement of the device, uncertain measurements etc. occur, the localization of the device for damaging the weed or of the working tool is necessary. The latter, for example, is able to be calculated from the known installation position and corresponding sensors in the kinematic chain, from the device position. The manipulator unit requires a closed loop control for guiding the working tool, in which the relative deviation between the working tool and the target object, i.e. the weed, is graded. An image-based method using a camera unit may be employed for this purpose according to the present invention. In this context, in particular 'visual servoing' with the aid of a visual servoing camera (abbreviated 'VS-camera') may be used. However, in addition to image processing, further comparable technologies such as scanning by laser may also be used.

The localization unit or the camera unit and/or the laser unit is/are situated on the manipulator unit, especially next to the working tool. In technical jargon, such systems are also referred to as "hand-I-systems". If the device includes a plurality of working tools, then a camera may be disposed on each working tool for an individual guidance of the working tools. When multiple working tools are used simultaneously, then it is also possible to provide only a single camera. However, working tools having an individual camera provide a high positional accuracy, which is why each additional camera generally increases the positioning accuracy. It is also possible, however, to fix the camera in place on the device in a permanent manner and to visually monitor the working tool and carry out the control on that basis.

Without departing from the scope of the present invention, however, it is by all means possible that the classification unit and the localization unit form one and the same unit, so that a single camera then carries out the dual task, i.e. the afore-described classification task (detection of the weeds) and the ascertaining of the relative positions between the working tool and the weed (visual servoing), which is used for guiding the working tool. In this case, the mentioned specific embodiments including a plurality of working tools of cameras are applicable in a similar manner.

It is furthermore advantageous if the manipulator unit includes at least two manipulators having at least one working tool in each case. According to the present invention, the positioning of the working tool is carried out with the aid of the manipulator unit. The manipulator unit may have correspondingly connected linear drives, similar to a plotter system, for this purpose. The manipulator unit may also have spindle drives, cog-belt drives, and linear motors. Similarly possible is the use of pneumatic and hydraulic drives or also the use of a magnetic guidance (levitation technology). In addition, the manipulator may also include parallel minus kinematic structures featuring two or three translatory degrees of freedom as well as further rotatory degrees of freedom. It is also possible that the manipulator is made up of serial minus kinematic structures.

In addition, it is advantageous if the at least two manipulators are designed to actuate the working tools independently of one another and to move them within defined work areas. This measure in particular makes it possible to increase the work output and the efficiency. The work areas of the working tools may advantageously run parallel to one another, or in other words, the working tools are connected in parallel so that multiple parallel manipulator/working tool combinations are disposed on the device, and each working tool has its dedicated work area. In this case, the increase in the working speed is achieved in that each manipulator/working tool unit covers only relatively short driving distances so that less time is lost to the positioning of the working tools.

In an advantageous manner, the work areas of the working tools may extend next to one another and/or at an offset from one another in the driving direction of the device. In other words, a plurality of manipulator/working tool units are connected in series one behind the other so that each manipulator/working tool unit is able to pass through the full work area. In such a case, the increase in the working speed (driving speed for the carrier vehicle) is achieved in that the manipulator/working tool units share the task. Here, intelligent working-path planning may determine which unit is used for which plants. A further increase in the working speed (driving speed of the carrier vehicle) is achieved if multiple units are switched one after the other and are disposed parallel to one another, where each unit has its dedicated work area and needs to travel only relatively short distances so that less time is lost to the positioning of the tools. Another advantageous development consists of combining manipulator/working tool units into modules, and of placing multiple modules parallel to one another. Each module may have its dedicated work area or its own plant row to be worked. This allows for a further increase in the work output since multiple rows may be worked in parallel. It is furthermore quite possible to provide different combinations of the afore-described systems. For example, the serial connection of systems results in a type of "stamp pad" by which an entire area is able to be simultaneously processed in a selective manner.

BRIEF DESCRIPTION OF THE DRAWINGS

Below, the present invention will be described in greater detail by way of example on the basis of the figures.

FIG. 5 shows a schematized plan view of the device according to the present invention for specific plant rows to be worked on.

DETAILED DESCRIPTION OF EXAMPLE EMBODIMENTS

Figure 1:
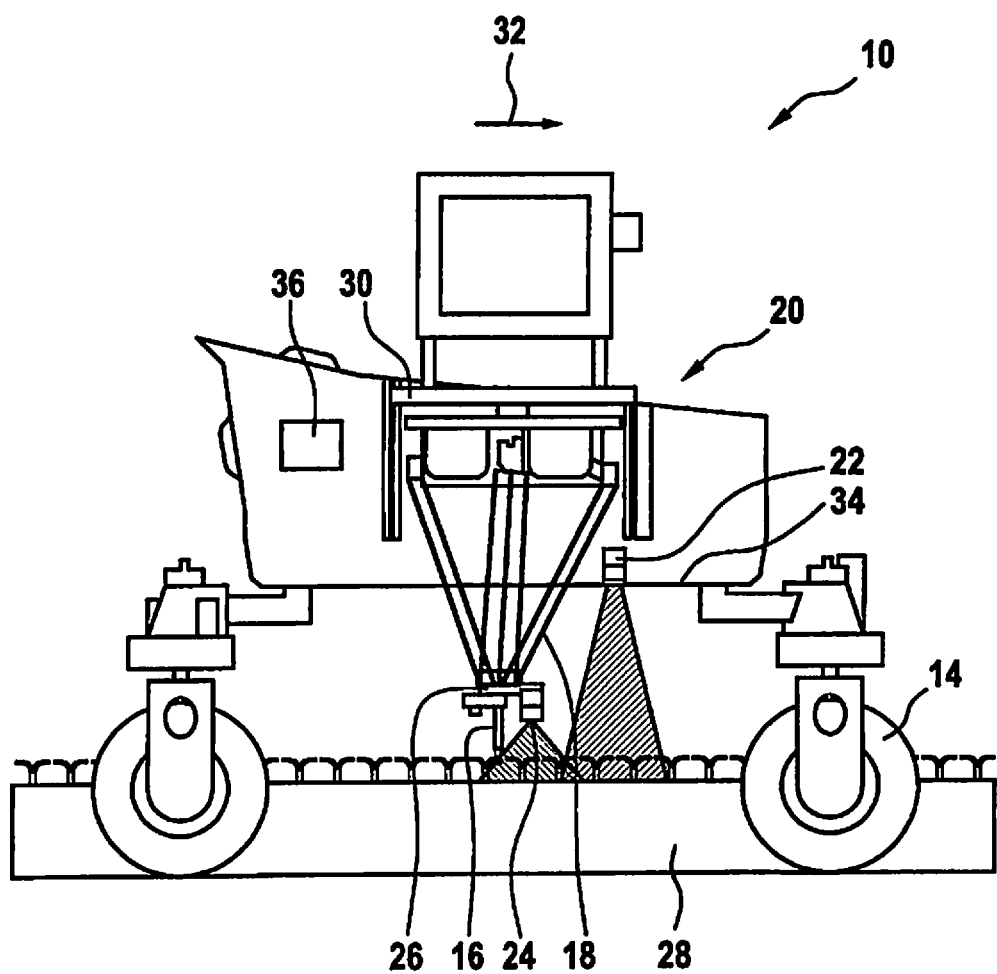
FIG. 1 shows a schematized illustration of a device for damaging weeds according to the present invention.

In the following description of preferred exemplary embodiments of the present invention, identical or similar reference numerals are used for the elements that have a similar effect and are shown in the various figures, and a repeated description of the elements is omitted.

FIG. 1 shows a weed-control device according to the present invention, which has been assigned the reference numeral 10 as a whole.

The weed-control device is developed as a mobile platform. For this purpose, weed-control device 10 is equipped with a drive unit 12 that includes wheels 14.

According to the present invention, weed-control device 12 includes a working tool 16, which is disposed on a manipulator 18 of a manipulator unit 20. In the present invention, weed-control device 10 furthermore has a classification unit 23 and a localization unit 24. In the illustrated exemplary embodiment, classification unit 22 and localization unit 24 are separate units, but it is by all means possible that both jointly form one unit (22, 24). In the illustrated exemplary embodiment, classification unit 22 is developed as an imaging system in the form of a camera.

Localization unit 24 is implemented as a visual servoing camera and disposed on a lower manipulator section 26 next to working tool 16. In other words, visual servoing camera 24 "hovers" above ground 28, where it ascertains the relative positions with respect to working tool 16 in the immediate vicinity of the weed to be worked on.

As may furthermore be gathered from FIG. 1, manipulator unit 20 also includes a positioning unit 30, which actuates manipulator 18. Positioning unit 30 will be described in greater detail in the following text with the aid of FIGS. 2 through 5.

In order to ensure an early detection of the weed, classification unit 22 is disposed in frontal region 34 in driving direction 32 of weed-control device 10. As mentioned at the outset, the classification unit may also be entirely dispensed with and a map that includes the positional data of the weed may be provided in its stead.

In addition, weed-control device 10 includes a control unit 36. Control unit 36 receives the data from classification unit 22 or holds the positional data of the weed in readiness, e.g., in the form of a map and/or by receiving the positional data with the aid of a receive unit. In addition, control unit 36 receives the data type of localization unit 24 and thereby ascertains the precise relative position between the working tool and the weed.

Due to the received control unit 36 accordingly manipulator unit 20 or manipulator 18, so that working tool 16 is able to be brought into a corresponding position in order to damage or destroy the weeds through an application of pressure, preferably using pulse-type triggering.

FIGS. 2 through 5 show different developments or setups of the manipulator unit and the corresponding manipulators. In this instance, three separate manipulators 18 are provided, each having a separate working tool 16. Manipulators 18 are able to be actuated independently of each other and have the capability of moving the working tool inside an entire working area 38 within defined working areas (38.1, 38.2, 38.3).

Figure 2:
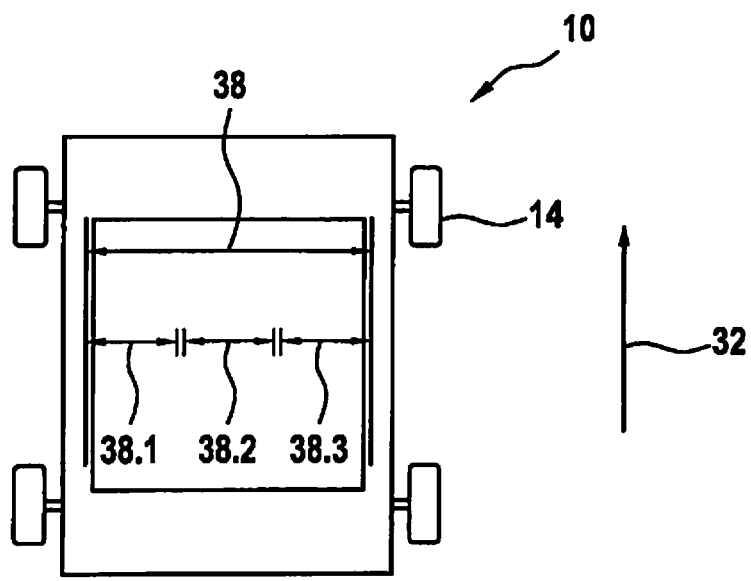
FIG. 2 shows a schematized plan view of the device according to the present invention with working tools.

FIG. 2 shows a parallel connection of the working tools. In other words, working areas 38.1, 38.2, 38.3 are disposed parallel to one another and next to one another in driving direction 32 of weed-control device 10. As a result, each working tool 16 has to travel only relatively short distances so that less time is lost to the positioning.

Figure 3:
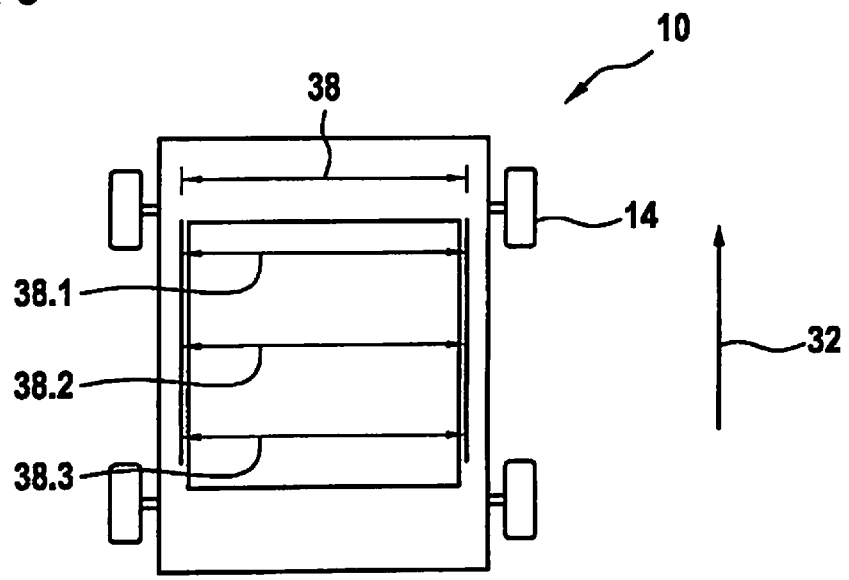
FIG. 3 shows a schematized plan view of the device according to the present invention with working tools connected in series.

FIG. 3 shows a series connection of working tools 16. In this instance, each working tool 16 once again has its own working area 38.1, 38.2, 38.3, these working areas being disposed in parallel again; however, in contrast to the specific embodiment shown in FIG. 2, they are situated one after the other in driving direction 32 of weed-control device 10. In this specific embodiment, each working tool 16 is able to pass through entire working area 38, and with the aid of intelligent work and/or driving schedules of control unit 36, it is possible to determine which particular working tool will be used for which plants, so that the driving speed, and thus the working speed, is able to be increased for weed-control device 10.

Figure 4:
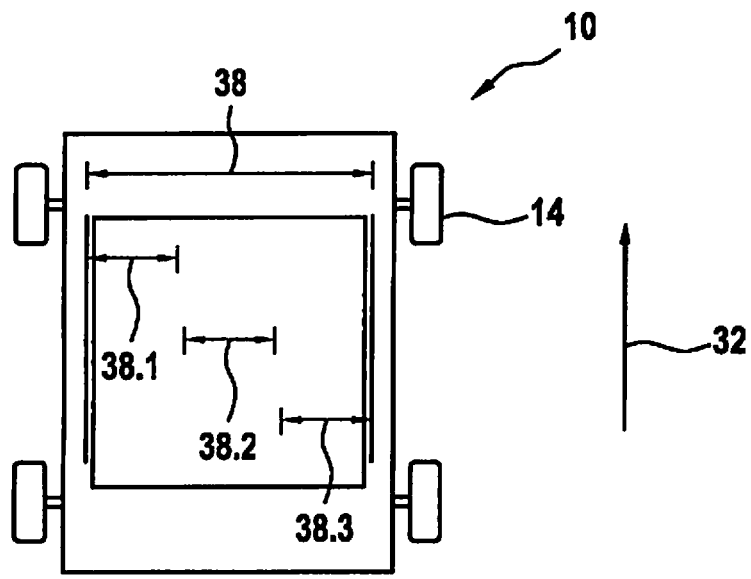
FIG. 4 shows a schematized plan view of the device according to the present invention with working tools that are connected in parallel and in series one after the other.

In the exemplary embodiment of weed-control device 10 shown in FIG. 4, working areas 38.1, 38.2, 38.3 of working tools 16 are disposed next to one another and at an offset to one another in driving direction 32 of weed-control device 10. Once again, each working tool 10 has its dedicated work area, and here, too, the working speed is able to be increased on account of relatively short driving distances.

Figure 5:
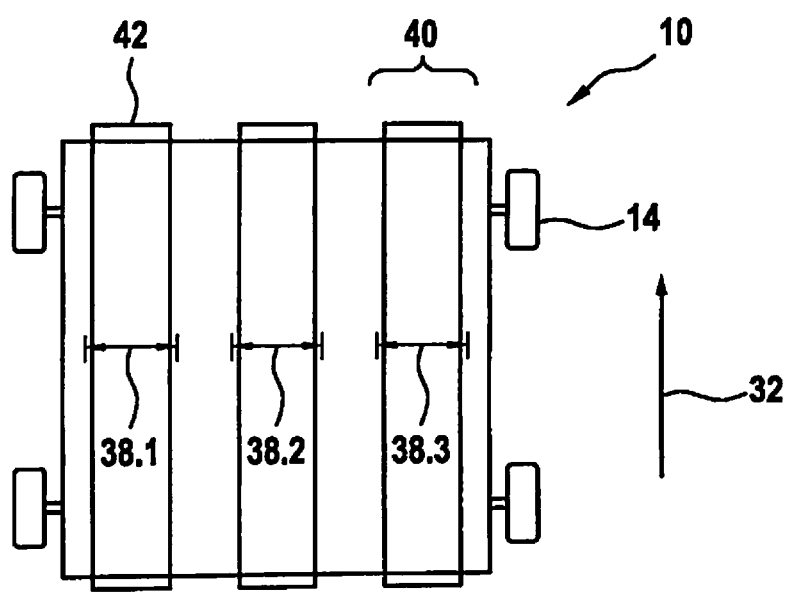

FIG. 5 shows a weed-control device 10 having working tools 16, which have working areas 38.1, 38.2, 38.3 that are spaced apart from one another. Although the working areas are disposed in parallel and next to each other in driving direction 32 of weed-control device 10, as in the specific embodiment shown in FIG. 2, an intentional gap has been provided between working areas 38.1, 38.2, 38.3 in which no weed control has to take place, so that the travel distances of working tools 16 are able to be shortened even more.

What is claimed is:

1. A device for damaging weeds, comprising:
   a working tool designed to damage the weed;
   a classification unit at least one of: (i) having positional data of the weed, and (ii) being designed to detect the weed;
   a localization unit designed to ascertain a relative position between the working tool and the weed; and
   a manipulator unit designed to correspondingly position the working tool as a function of the ascertained relative position;
   wherein the working tool is configured to exert a pulse-type pressure in order to damage the weed, and wherein the working tool is a mechanical stamp.

2. The device as recited in claim 1, wherein the classification unit at least one of: (i) has the positional data of the weed in the form of a map, and (ii) detects the weed with the aid of at least one of a camera unit and a laser unit.

3. The device as recited in claim 1, wherein the localization unit ascertains the relative position between the working tool and the weed with the aid of at least one of a camera unit and a laser unit.

4. The device as recited in claim 1, wherein the localization unit is disposed on the manipulator unit next to the working tool.

5. The device as recited in claim 1, wherein the manipulator unit has at least two manipulators each having at least one working tool.

6. The device as recited in claim 5, wherein the at least two manipulators are developed to actuate the working tools independently of one another and to move them within defined working areas.

7. The device as recited in claim 6, wherein the work areas of the working tools extend parallel to one another.

8. The device as recited in claim 7, wherein the working areas of the working tools extend at least one of next to one another and at an offset from one another in a driving direction of the device.

9. The device as recited in claim 1, wherein the mechanical stamp is configured to mechanically press the weed into the ground.

10. The device as recited in claim 1, wherein the manipulator is configured to move the mechanical stamp in all three spatial dimensions.

11. A method for damaging weed, the method comprising:
    providing a working tool, the working tool includes a mechanical stamp;
    ascertaining a position of a weed the aid of a classification unit, which at least one of: (i) has positional data of the weed in the form of a map, and (ii) detects the weed with the aid of at least one of a camera unit and a laser unit;
    ascertaining a relative position between the working tool and the weed with the aid of a localization unit which includes a camera unit;
    positioning the working tool as a function of the ascertained relative position with the aid of a manipulator unit; and damaging the weed using pulse-type application of pressure by the mechanical stamp to the weed.

12. The method as recited in claim 11, wherein the damaging the weed step includes the stamp mechanically pressing the weed into the ground.

\* \* \* \* \*